(12) United States Patent
Walters et al.

(10) Patent No.: US 11,295,311 B2
(45) Date of Patent: Apr. 5, 2022

(54) SYSTEM AND METHOD FOR HANDLING POINT OF SALE CARD REJECTIONS

(71) Applicant: Capital One Services, LLC, McLean, VA (US)

(72) Inventors: Austin Walters, Savoy, IL (US); Vincent Pham, Champaign, IL (US); Jeremy Goodsitt, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/915,127

(22) Filed: Jun. 29, 2020

(65) Prior Publication Data

US 2021/0406901 A1   Dec. 30, 2021

(51) Int. Cl.
*G06K 5/00* (2006.01)
*G06Q 20/40* (2012.01)
*G06Q 20/20* (2012.01)
*G06Q 20/32* (2012.01)
*G06Q 20/22* (2012.01)

(52) U.S. Cl.
CPC ....... *G06Q 20/4037* (2013.01); *G06Q 20/204* (2013.01); *G06Q 20/227* (2013.01); *G06Q 20/3223* (2013.01); *G06Q 20/401* (2013.01); *G06Q 20/405* (2013.01)

(58) Field of Classification Search
CPC .. G06Q 20/34; G06Q 20/342; G06Q 20/4016; G06Q 20/10; G06Q 20/384
USPC ................. 235/380, 382, 383, 492
See application file for complete search history.

(56) References Cited

U.S. PATENT DOCUMENTS

| | | | |
|---|---|---|---|
| 5,777,305 A | 7/1998 | Smith et al. | |
| 5,986,565 A | 11/1999 | Isaka | |
| 6,896,182 B2 | 5/2005 | Sakaguchi | |
| 7,600,675 B2 | 10/2009 | Petralia et al. | |
| 7,604,163 B2 | 10/2009 | Natsuno | |
| 7,676,438 B2 | 3/2010 | Brewer et al. | |
| 7,949,373 B2 | 5/2011 | Whiting | |
| 8,083,130 B1 | 12/2011 | Cipriano | |
| 10,565,587 B1 * | 2/2020 | Newman | G06Q 20/3829 |
| 2003/0004876 A1 | 1/2003 | Jacobson | |
| 2004/0117514 A1 | 6/2004 | Nelms et al. | |
| 2006/0018450 A1 | 1/2006 | Sandberg-Diment | |
| 2006/0043172 A1 | 3/2006 | Ho et al. | |
| 2007/0001849 A1 | 1/2007 | Black et al. | |
| 2007/0181672 A1 | 8/2007 | Sawamura | |
| 2007/0187482 A1 | 8/2007 | Castro | |
| 2009/0006144 A1 | 1/2009 | Nakajima | |
| 2009/0156238 A1 | 6/2009 | Smith | |
| 2010/0057620 A1 | 3/2010 | Li et al. | |
| 2010/0223146 A1 | 9/2010 | Entenmann | |

(Continued)

*Primary Examiner* — Daniel St Cyr
(74) *Attorney, Agent, or Firm* — Hunton Andrews Kurth LLP (57) ABSTRACT

Systems and methods for transaction processing control are presented. Transaction processing control may be obtained through interaction of a POS device, an account card, and a mobile device. Transaction processing control may be provided in the context of providing account information, including handling requests to select and provide a second account number via a mobile device in communication with a rejected card such that the rejected card need not be removed from the point of sale device and a second card need not be submitted to the point of sale device.

20 Claims, 7 Drawing Sheets

System 100

(56) References Cited

U.S. PATENT DOCUMENTS

| | | |
|---|---|---|
| 2011/0101096 A1 | 5/2011 | Tawara |
| 2012/0123937 A1* | 5/2012 | Spodak .............. G06K 19/0723 |
| | | 705/41 |
| 2013/0043303 A1 | 2/2013 | Chen |
| 2013/0067216 A1 | 3/2013 | Tanner et al. |
| 2013/0173405 A1 | 7/2013 | Gouessant |
| 2013/0200999 A1* | 8/2013 | Spodak .............. G06K 19/0723 |
| | | 340/5.65 |
| 2014/0019351 A1 | 1/2014 | Carmichael et al. |
| 2014/0101035 A1 | 4/2014 | Tanner et al. |
| 2019/0295093 A1* | 9/2019 | Buckley ............. G06Q 20/4037 |

* cited by examiner

System 100

CARD 300

SYSTEM AND METHOD FOR HANDLING POINT OF SALE CARD REJECTIONS

FIELD OF THE DISCLOSURE

The present disclosure relates generally to point of sale technology and, more specifically, to an exemplary system and method for handling rejection of a card presented at a point of sale device.

BACKGROUND

Account-linked cards have become commonplace, as many individuals use account-linked cards such as those for access to credit or debit accounts, membership club accounts, rewards accounts, parking facilities, secured buildings, accounts at banking institutions, accounts for mass transportation and other types of accounts. Account-linked cards are frequently used with card readers or devices equipped with card readers, some of which require the account holder to insert the account-linked card containing information on a magnetic strip or embedded memory into the card reader. After the card has been read and authenticated, the account holder may be able to carry out a variety of transactions or inquiries. However, on occasion an account holder may have his or her card rejected after submission to a card reader at a point of sale system, resulting in inconvenience and potential embarrassment to the account holder. Card rejection may happen for a number of reasons, such as, for example, expiration of the account, insufficient funds, etc.

Thus, it may be beneficial to provide exemplary systems and methods which allow users to handle card rejection in a rapid and straightforward manner to overcome at least some of the deficiencies described herein.

SUMMARY

Aspects of the disclosed technology include systems and methods for transaction processing control. Transaction processing control may be provided in the context of providing account information, including handling requests to select and provide a second account number via a mobile device in communication with a rejected card such that the rejected card need not be removed from the point of sale device and a second card need not be submitted to the point of sale device. In this way, a second account number may be rapidly provided in a secure manner without having to store multiple account numbers on the card. This provides an advantage over use of a card storing multiple account numbers, since loss or theft of such a card having multiple account numbers would present heightened risk to a user by exposing multiple accounts, rather than a single account, to a thief or other party possessing the card.

Embodiments of the present disclosure provide a point of sale device, comprising: a card reader configured to read account information from an inserted card, the account information including an inserted card account number that is stored on the inserted card; a communications interface that is configured for data communication with an authorization network; and a processor connected to the card reader and the communications interface, the processor configured to: receive the account information from the card reader; communicate the inserted card account number via the authorization network to determine whether a transaction associated with the inserted card is authorized; receive an authorization response, the authorization response including a rejection notification if the transaction is not authorized; transmit the rejection notification to a mobile device, the mobile device in data communication with the inserted card via a wireless connection; receive a second account number that is stored on the mobile device; and communicate the second account number via the authorization network to determine whether the transaction associated with the second account number is authorized.

Embodiments of the present disclosure provide a payment card, comprising: memory configured to store a first account number; a contact pad configured to, when the payment card is inserted into a point of sale device, transmit the account number to a card reader of the point of sale device and to receive a transaction rejection response if a transaction associated with the first account number is rejected; and a wireless communication interface configured for data communication with a mobile device; wherein, the transaction rejection response, upon receipt via the contact pad, is transmitted to the mobile device, thereby causing the mobile device to transmit a second account number stored on the mobile device in a manner that enables the second account number to be used to process the transaction instead of the first account number.

Embodiments of the present disclosure provide a method for transaction processing control, comprising: receiving, at a card reader of a point of sale device via a contact pad on a payment card in communication with the card reader, a first account number associated with the payment card; transmitting, via a communications interface, a first transaction authorization request that includes the first account number and a transaction amount to an authorization network; receiving, via the communications interface, a transaction rejection from the authorization network, said transaction rejection responsive to the first transaction authorization request; transmitting information indicating the transaction rejection to the contact pad on the payment card via the card reader; receiving, at the card reader of the point of sale device via the contact pad on the payment card, a second account number that is not associated with the payment card, said second account number being stored on a mobile device in wireless communication with the payment card; and transmitting, via a communications interface, a second transaction authorization request that includes the second account number and the transaction amount to an authorization network.

Further features of the disclosed design, and the advantages offered thereby, are explained in greater detail hereinafter with reference to specific example embodiments described below and illustrated in the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Exemplary embodiments of the disclosed systems and methods provide for transaction processing control through the interaction of a point of sale device, an account-linked card, and a mobile device to provide a second account number upon rejection, at a point of sale, of an account associated with the account-linked card. Benefits of the disclosed technology may include improved data security for account information, improved fraud prevention, and improved user experience.

Figure 1:
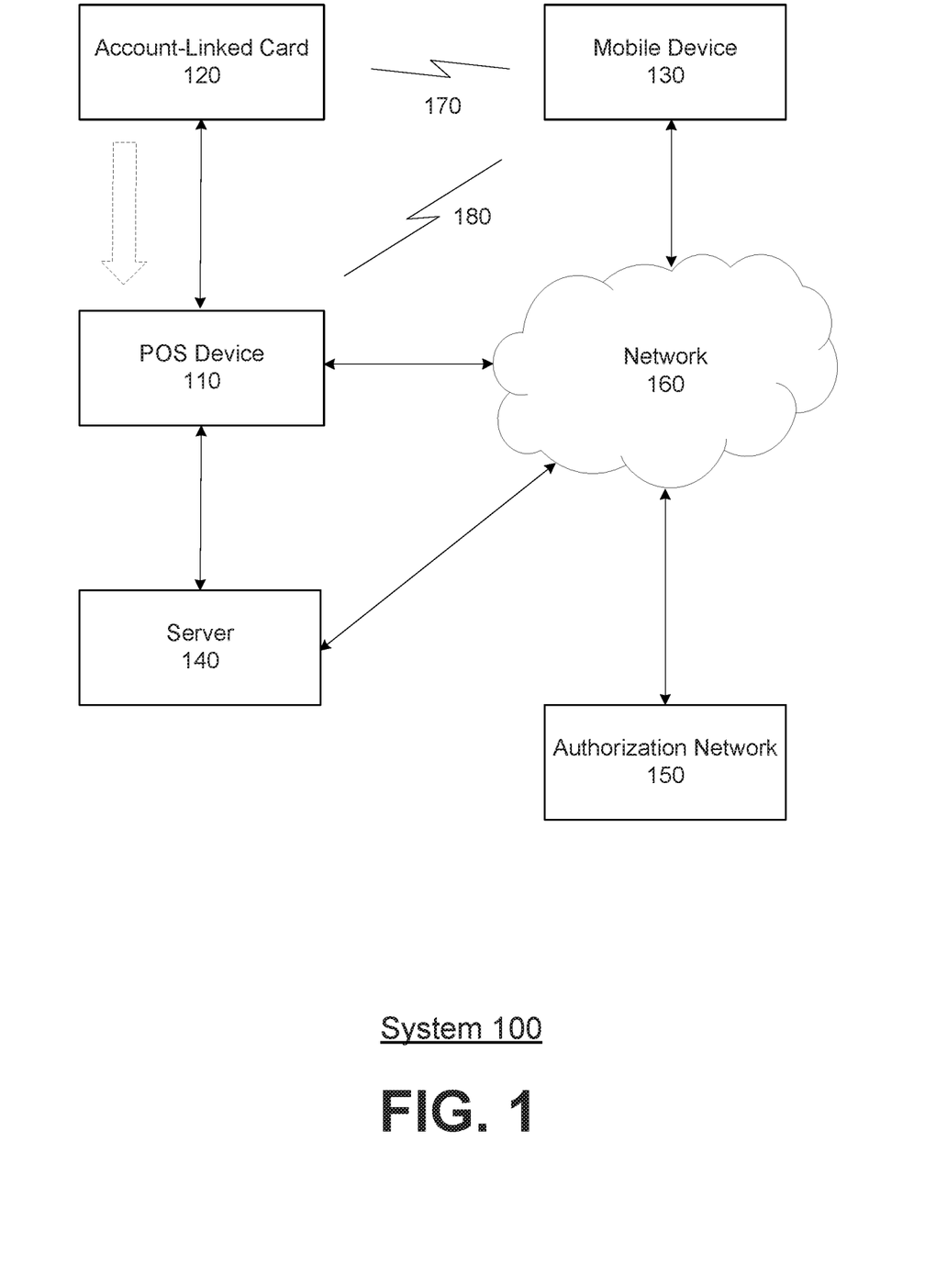
FIG. 1 is a diagram of a transaction processing control system according to one or more example embodiments.

FIG. 1 shows a diagram illustrating a transaction processing control system 100 according to one or more example embodiments. As discussed further below, system 100 may include point of sale (POS) device 110, account linked card 120, mobile device 130, and server 140. Mobile device 130 may communicate with POS device 110 via short-range wireless communication field 180, which may include Bluetooth, near field communication (NFC), or RFID. In some embodiments, Mobile device 130 may communicate with POS device 110 through server 140 via network 160. In some embodiments, POS device 110 may communicate with transaction authorization network 150 through server 140 via network 160. In some embodiments, POS device 110 may communicate with transaction authorization network 150 via network 160 or another network (not shown) without going through server 140. Mobile device 130 may communicate with account linked card 120 via short-range wireless communication field 170, which may include Bluetooth, NFC, or RFID. Although FIG. 1 illustrates certain components connected in certain ways, system 100 may include additional or multiple components connected in various ways via one or more networks.

System 100 may include one or more point of sale (POS) devices 110. POS device 110 may be a terminal, ATM, kiosk, and/or another device in which a user inserts an account-linked card or other form of identification card and/or information card into a card reader. POS device 110 obtains account and/or card information from the card and transmits the information to card authorization network 150 for authorization of the requested transaction. Additional features that may be included in a POS device, such as point of sale (POS) device 110, are further described below with reference to FIG. 2.

System 100 may include one or more account-linked cards 120. Account-linked card 120 may be a smart card or another type of card (including, e.g., a contactless card) configured for inserting, swiping, tapping etc. in or near POS device 110 (which may have a card reader for that purpose). Account-linked card 120 may be associated with an account holder or user. Account-linked card 120 may contain information regarding an account, including account number and/or other information regarding the account and card, such as, for example, account identification information (e.g., account number, account owner identification number, account owner name and contact information), account characteristics (e.g., type of account,), card issuer, etc. An account may be maintained by (or on behalf of) and/or relate to any one or more of a variety of entities, such as, for example (and without limitation) a bank, merchant, online retailer, service provider, merchandizer, manufacturer, social media provider, provider or promoter of sporting or entertainment events, hotel chain, etc. Additional features that may be included in an account-linked card, such as account-linked card 120, are further described below with reference to FIGS. 3A-3B.

System 100 may include one or more mobile devices, such as mobile device 130, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. A mobile device, such as mobile device 130, may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. Additional features that may be included in a mobile device, such as mobile device 130, are further described below with reference to FIG. 4.

System 100 may include one or more servers 140. In some example embodiments, server 140 may include one or more processors (such as, e.g., a microprocessor) which are coupled to memory. Server 140 may be configured as a central system, server or platform to control and call various data at different times to execute a plurality of workflow actions. Server 140 may be a dedicated server computer, such as bladed servers, or may be one or more personal computers, laptop computers, notebook computers, palm top computers, network computers, mobile devices, or any processor-controlled device capable of supporting the features of server 140.

Server 140 may be configured for data communication (such as, e.g., via a connection) with POS device 110. Connections between POS device 110 and server 140 may be made via any communications line, link or network, or combination thereof, wired and/or wireless, suitable for communicating between these components. Such network may include network 160 and/or one or more networks of same or similar type as those described herein with reference to network 160. In some example embodiments, connections between POS device 110 and server 140 may include a corporate LAN.

Server 140 may be configured for data communication (such as, e.g., via a connection) with one or more other devices of system 100 via network 160. For example, mobile device 130 may communicate with POS device 110 through server 140 via network 160. Similarly, POS network 110 may communicate with authorization network 150 through server 140 via network 160.

Authorization network 150 may include one or more parties that may be in the chain of communication for a transaction authorization request that is sent upon a user's attempt to use an account-linked card for a transaction. Such parties may include a merchant or processing bank (such as, e.g., a bank associated with the point of sale merchant), credit card company or association (such as, e.g., Visa, MasterCard, American Express, etc.), card issuer (e.g., bank issuing the credit card to the user). A transaction request initiated at point of sale device 110 may be transmitted with accompanying card and/or account information for processing to authorization network 150 for authorization of the transaction. A transaction request may be authorized, or rejected, or subject of other status, and the result may be transmitted back to POS device 110.

Network 160 may include one or more of a wireless network, a wired network or any combination of wireless network and wired network, and may be configured to connect, for purposes of data communication, one or more devices in system 100, including, for example, POS device 110, mobile device 130, server 140, and/or authorization network 150 (as discussed above, some communications with POS device 110 may occur through server 140). For example, network 160 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 160 may include, without limitation, telephone lines, fiber optics, IEEE Ethernet 902.3, a wide area network, a wireless personal area network, a LAN, or a global network such as the Internet. In addition, network 160 may support an Internet network, a wireless communication network, a cellular network, or the like, or any combination thereof. Network 160 may further include one network, or any number of the exemplary types of networks mentioned above, operating as a stand-alone network or in cooperation with each other. Network 160 may utilize one or more protocols of one or more network elements to which they are communicatively coupled. Network 160 may translate to or from other protocols to one or more protocols of network devices. Although network 160 is depicted as a single network, it should be appreciated that according to one or more example embodiments, network 160 may comprise a plurality of interconnected networks, such as, for example, the Internet, a service provider's network, a cable television network, corporate networks, such as credit card association networks, a LAN, and/or home networks.

Communication between devices may include any methods used for data communication over a network, including, for example, a text message, an e-mail, or other messaging techniques appropriate in a network-based configuration. Communication methods may include an actionable push notification with an application stored on mobile device 130.

Figure 2:
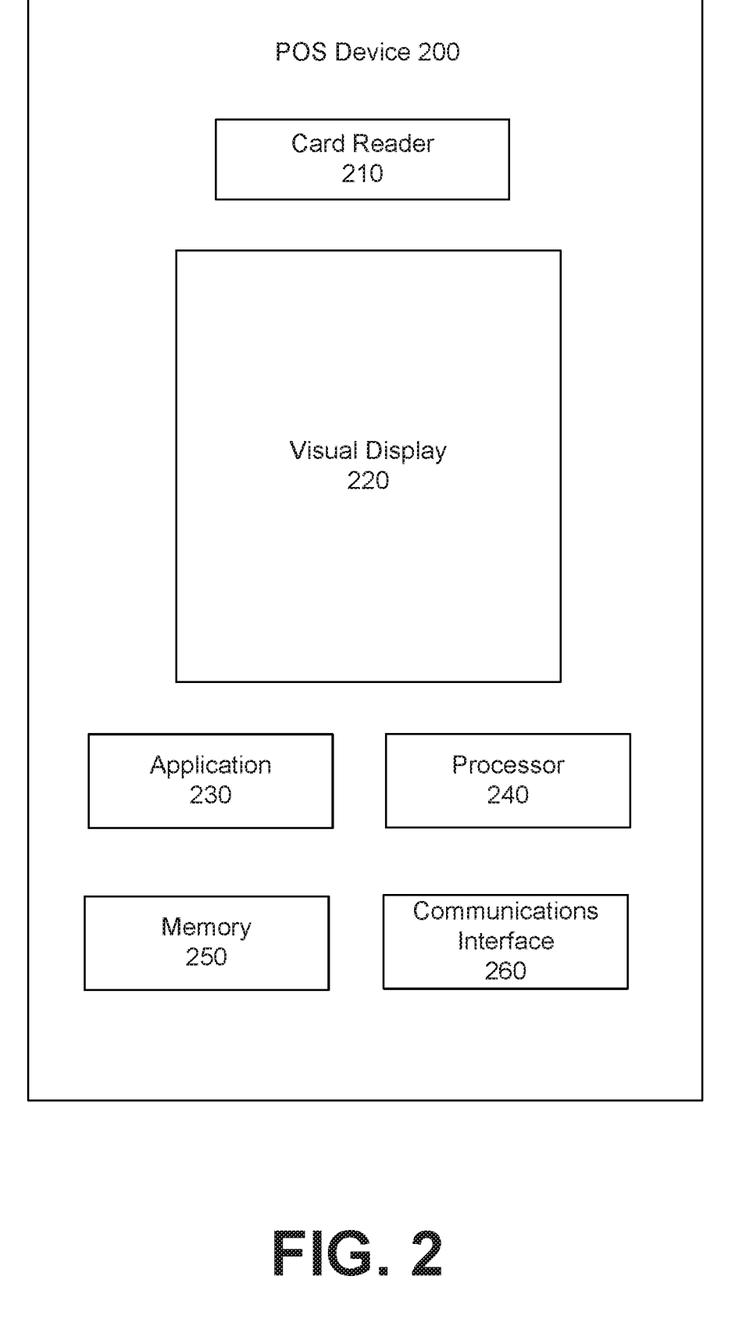
FIG. 2 is a diagram illustrating components of a point of sale (POS) device used in a transaction processing control system according to one or more example embodiments.

FIG. 2 is a diagram illustrating components of a point of sale (POS) device 200 used in a transaction control system according to one or more example embodiments. POS device 200 may be POS device 110 described above with reference to FIG. 1. POS device 200 may include card reader 210, visual display 220, application 230 processor 240, memory 250, and communications interface 260. It is understood that not all embodiments include every component shown in FIG. 2. It is also understood that, while FIG. 2 depicts a single instance of each component, embodiments may contain multiple instances of any components.

Card reader 210 may be configured to read and authenticate an account-linked card, such as account-linked card 120. Card reader 210 may include a card sensor to detect the presence of a card within the card reader. Card reader 210 may be in data communication with other components of POS device 200, including processor 240, memory 250, and/or communications interface 260.

Visual display 220 may include any type of device for presenting visual information such as a computer monitor, video monitor, a flat panel display, touch screen display, or a mobile device screen, and may include technology such as, for example, liquid crystal display, light-emitting diode (LED) display, plasma panel, and/or a cathode ray tube display technology.

Application 230 may include a software application or executable program code stored in memory 250 to be executed on processor 240, and be configured to carry out features described herein for any of the POS devices described herein. Application 230 may be configured, for example, to transmit and/or receive data with other devices via communications interface 260 of POS device 200. For example, application 230 may be configured to initiate or respond to one or more requests and/or to send or receive messages, such as requests or messages involving card 120 and/or mobile device 130. Application 230 may also be configured to provide a user interface via visible display 220. Further features carried out by application 230 are described below with reference to FIG. 5.

Processor 240 may include one or more processing devices such as a microprocessor, RISC processor, ASIC, etc., and may include associated processing circuitry. Processor 240 may include, or be connected to, memory (such as memory 250) storing executable instructions and/or data, as may be necessary or appropriate to control, operate or interface with the other features of POS device 200, including application 230 or any other applications running on POS device 200. Processor 240 (including any associated processing circuitry) may contain additional components including processors, memories, error and parity/CRC checkers, data encoders, anticollision algorithms, controllers, command decoders, security primitives and tamper-proofing hardware, as necessary to perform the functions described herein.

Memory 250 may include read-only memory, write-once read-multiple memory and/or read/write memory, e.g., RAM, ROM, and EEPROM, including any combination thereof. Memory 250 may store executable instructions and/or data, as may be necessary or appropriate to control, operate or interface with the other features of POS device 200, including any applications running on POS device 200.

Communications interface 260 may include wired or wireless data communication capability. These capabilities may support data communication with a wired or wireless communication network, including the Internet, a wide area network (WAN), a local area network (LAN), a wireless personal area network, a wide body area network, a cellular network, a telephone network, any other wired or wireless network for transmitting and receiving a data signal, or any combination thereof (including, e.g., a WiFi network). Communications interface 260 may support communication via a short-range wireless communication field, such as Bluetooth, NFC, or RFID, and may include a reader, such as a NFC reader. Communications interface 260 may be configured to communicate with mobile device 130 over a network and protocol common to both devices. Communications interface 260 may be configured to communicate with account-linked card 120 via contact pin of card 120 or via a short-range wireless communication field, such as Bluetooth, NFC, or RFID.

Communications between POS device 200 and other devices may be encrypted or decrypted using any suitable cryptographic method. In some embodiments, processor 240 may encrypt data (e.g., account data) prior to transmitting data to other devices, using any suitable cryptographic method.

POS device 200 may also include an input/output device (not shown), which may include any device for inputting information or data, such as, e.g., a key pad, keyboard, electronic pen, touch screen display, etc., and may also include output devices providing information or alerts. In some embodiments, the input/output device may be incorporated in whole or in part with visual display 220 (such as, e.g., a touch screen display).

Figure 3A:
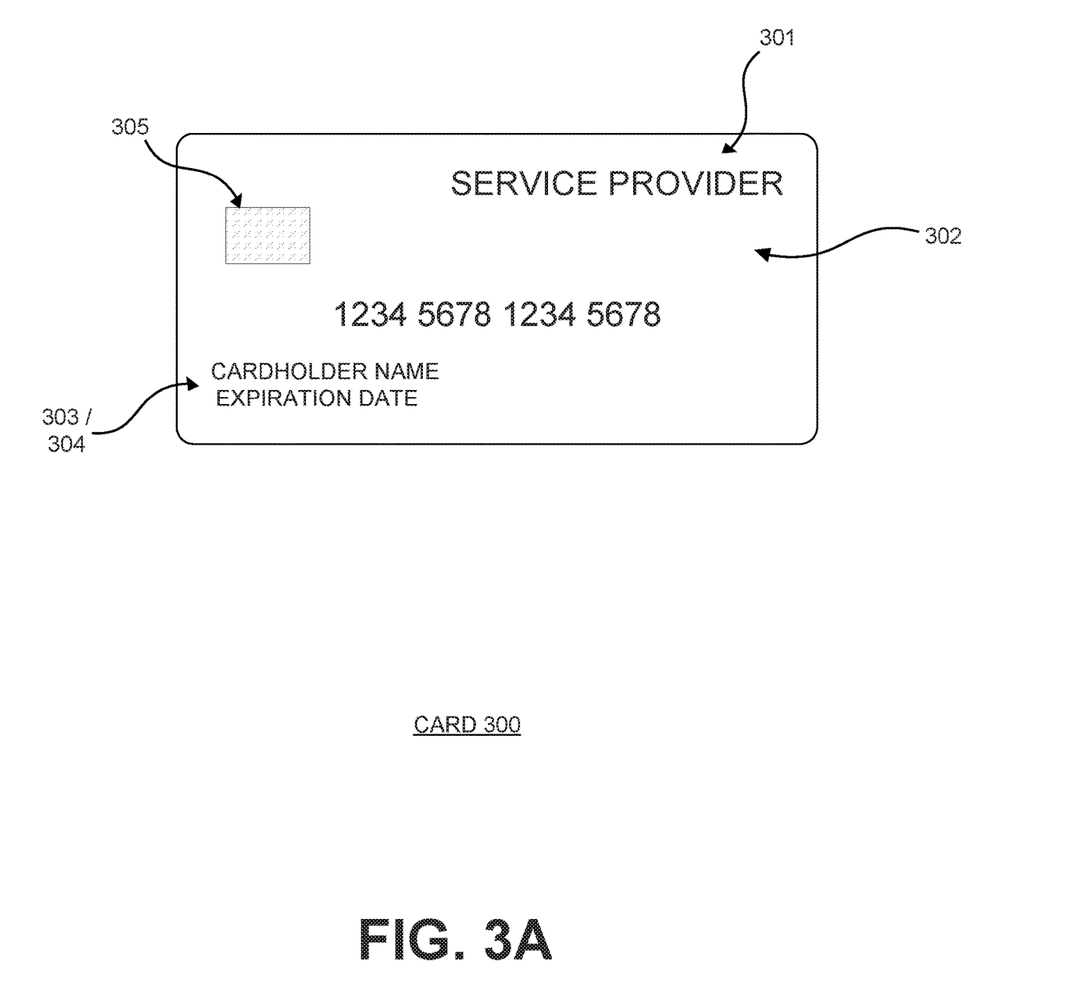
FIG. 3A illustrates an account linked card used in a transaction processing control system according to one or more example embodiments.

FIG. 3A illustrates an account-linked card 300 used in a transaction processing control system according to one or more example embodiments. Account-linked card 300 may be a payment card, such as a credit card, debit card, or gift card, issued or activated by a service provider. Card 300 may be account-linked card 120 described above with reference to FIG. 1. A service provider or card association name or identifier 301 may be displayed on the front or back of card 300. In some embodiments, card 300 may be a contactless card. Card 300 may include a substrate 302, which may include a single layer or one or more laminated layers composed of plastics, metals, and other materials. Card 300 may include identification information such as cardholder name 303 and/or account number 304 displayed on the front and/or back of the card; an expiration date may also be displayed on the front and/or back of the card. Card 300 may also include contact pad 305. It is understood that not all embodiments include every feature shown in FIG. 3A.

Figure 3B:
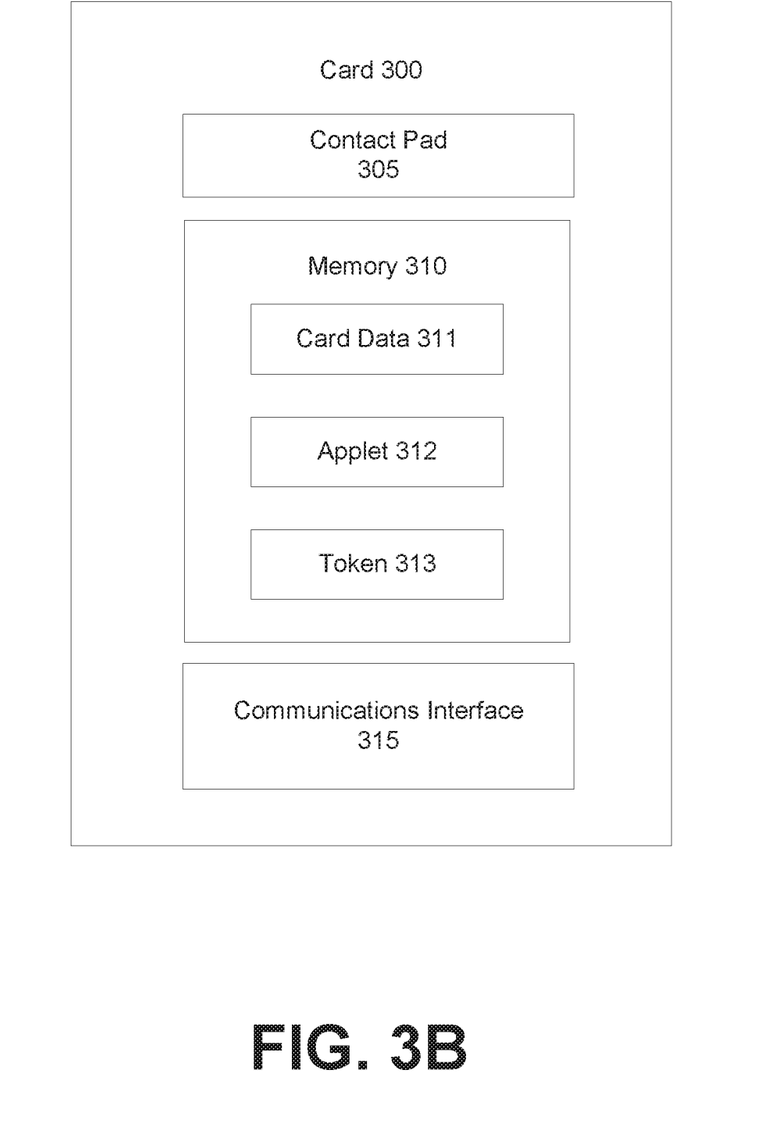
FIG. 3B is a diagram illustrating components of an account linked card used in a transaction processing control system according to one or more example embodiments.

FIG. 3B is a diagram illustrating components of an account linked card 300 used in a transaction processing control system according to one or more example embodiments. Account-linked card 300 may include some or all features described above with reference to FIG. 3A, and may include contact pad 305, memory 310 and communications interface 315. It is understood that not all embodiments include every component shown in FIG. 3B. It is also understood that, while FIG. 3B depicts a single instance of each component, embodiments may contain multiple instances of any components.

Contact pad 305 may be configured to establish contact with another communication device, such as POS device 110, or a user device, smart phone, laptop, desktop, tablet computer, or any other device having an appropriate card reader. Contact pad 305 may include a pin to provide power (e.g., DC voltage) enabling electronic operation of other components (such as, e.g., memory 310 or communications interface 315) of card 300.

Memory 310 may include a read-only memory, write-once read-multiple memory or read/write memory, e.g., RAM, ROM, and EEPROM. Memory 310 may be configured to store card data 311, one or more applets 312, and one or more tokens 313.

Card data 311 may include data such as, e.g., account number, expiration date, and/or an identifier for the account holder or user for the specific account associated with a specific card 300. Card data 311 would not include data relating to other accounts or cards.

Applet 312 may comprise one or more software applications configured to execute on a processor, such as a Java Card applet that may be executable on a contactless card. However, it is understood that applet 312 is not limited to Java Card applets, and instead may be any software application operable on contactless cards or other devices having limited memory. Applet 312 may be configured to respond to one or more requests, such as near field data exchange requests from a client device, including requests from a device having a reader such as a mobile device NFC reader. Applet 312 may be configured to read (or write) data, including card data 311 and/or token 313, from (or to) memory 310 and provide the data, in response to a request.

Token 313 may include a unique alphanumeric identifier assigned to a user of card 300, and the identifier may distinguish the user of card 300 from other users. In some example embodiments, token 313 may include a key unique to the user or customer with which card 300 is associated. Token 313 may be used to verify the identity of the account holder or user associated with the card, or may be used to increase security through token authorization.

Communications interface 315 may support communication via a short-range wireless communication field, such as Bluetooth, NFC, or RFID. Card 300 may also include one or more antennas (not shown) connected to communications interface 315 to provide connectivity with a short-range wireless communications field.

Card 300 may include a processor (such as microprocessor, RISC processor, ASIC, etc.,) and/or processing circuitry for storing and processing information, an antenna and/or other components (not shown), any of which may be incorporated within or near contact pad 305. Such processor may include, or be connected to, memory storing executable instructions and/or data, as may be necessary or appropriate to control, operate or interface with other components or features of system 100.

Card 300 may also include a magnetic strip or tape, which may be located on the back of the card (not shown). The magnetic strip or tape may store card data, such as account number, expiration date, etc. for the account linked to the specific card, but would not store data for any other accounts.

In an embodiment, account-linked card 300 may be a contactless card configured to communicate with POS device 110 via near field communication (NFC). In an embodiment, card 300 may be configured to swipe in POS device 110. In these and some other embodiments, card 300 may include a battery (not shown) contained within the card, such that the battery would provide power (e.g., DC voltage) when power is not supplied to card 300 via contact pad 305, enabling electronic operation of components (such as, e.g., memory 310 or communications interface 315) of card 300.

In some embodiments, communications between account-linked card 300 and other devices may be may be encrypted or decrypted using any suitable cryptographic method. In some embodiments, data on card 300 (e.g., card data 311 and/or token 313) may be stored in encrypted form, using any suitable cryptographic method.

Figure 4:
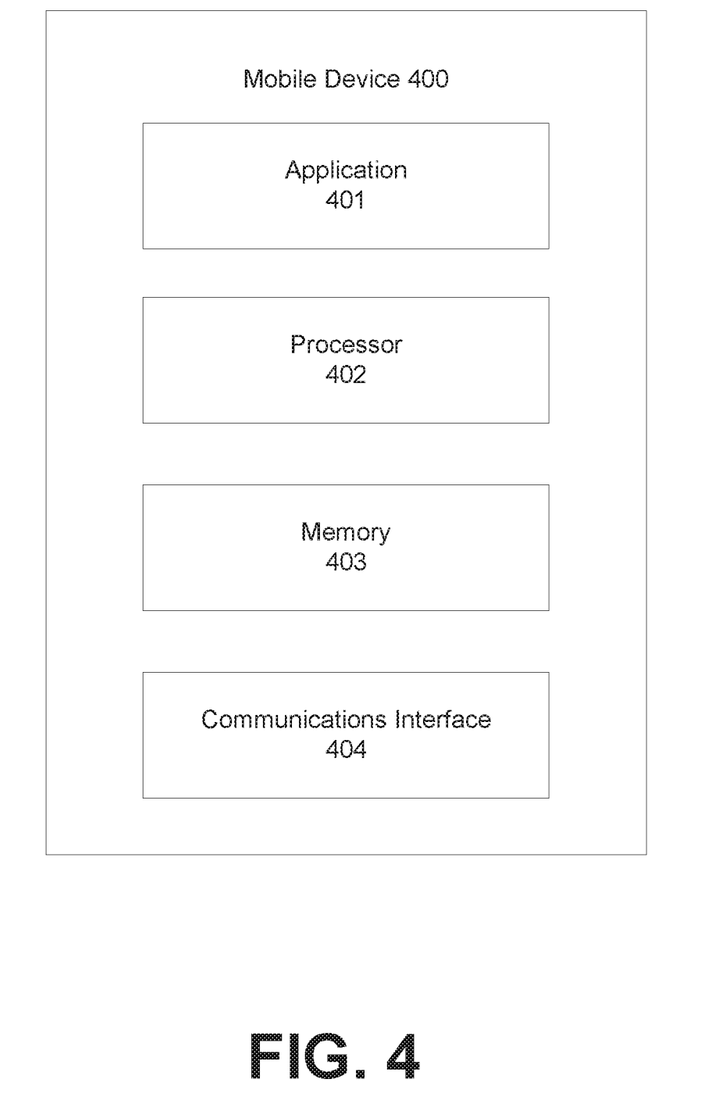
FIG. 4 is a diagram illustrating components of a mobile device used in a transaction processing control system according to one or more example embodiments.

FIG. 4 is a diagram illustrating components of a mobile device 400 used in a transaction processing control system according to one or more example embodiments. Mobile device 400 may be mobile device 130, described above with reference to FIG. 1. Mobile device 400 may include application 401, processors 402, memory 403, and communications interface 404. It is understood that not all embodiments include every component shown in FIG. 4. It is also understood that, while FIG. 4 depicts a single instance of each component, embodiments may contain multiple instances of any components.

Application 401 may include a software application or executable program code stored in memory 403 to be executed on processor 402, and be configured to carry out features described herein for any of the mobile devices described herein. Application 401 may be configured, for example, to transmit and/or receive data with other devices via communications interface 404 of mobile device 400. For example, application 401 may be configured to initiate or respond to one or more requests and/or to send or receive messages, such as requests or messages involving POS device 110 and/or card 120. Application 401 may also be configured to provide a user interface via a display (not shown) for a user of the mobile device. Further features carried out by application 401 are described below with reference to FIG. 6.

In an example embodiment, application 401 may be launched in response to a tap action between card 120 and mobile device 400. As used herein, a tap action may include tapping card 120 against a screen or other portion of mobile device 400 (or vice-versa). However, a tap action is not limited to a physical tap, and may include other gestures, such as, e.g., a wave or other movement of card 120 in the vicinity of mobile device 400 (or vice-versa).

Processor 402 may include one or more processing devices such as a microprocessor, RISC processor, ASIC, etc., and may include associated processing circuitry. Processor 402 may include, or be connected to, memory (such as memory 403) storing executable instructions and/or data, as may be necessary or appropriate to control, operate or interface with the other features of mobile device 400, including application 401. Processor 402 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Memory 403 may include a read-only memory, write-once read-multiple memory and/or read/write memory, e.g., RAM, ROM, and EEPROM, and may store code comprising application 401. Memory 403 may store data including account data for one or more additional accounts (such as other account-linked cards) associated with a user.

Communications interface 404 may include wired or wireless data communication capability. These capabilities may support data communication with a wired or wireless communication network, including the Internet, a wide area network (WAN), a local area network (LAN), a wireless personal area network, a wide body area network, a cellular network, a telephone network, any other wired or wireless network for transmitting and receiving a data signal, or any combination thereof (including, e.g., a WiFi network). Communications interface 400 may support communication via a short-range wireless communication field, such as Bluetooth, NFC, or RFID, and may include a reader, such as a NFC reader. Communications interface 404 may be configured to communicate with POS device 110 over a network and protocol common to both devices. Communications interface 404 may be configured to communicate with account-linked card 120 via a short-range wireless communication field, such as Bluetooth, NFC, or RFID.

Mobile device 400 may also include a display (not shown). Such display may be any type of device for presenting visual information such as a computer monitor, a flat panel display, or a mobile device screen, including liquid crystal displays, light-emitting diode displays, plasma panels, and cathode ray tube displays.

Mobile device 400 may also include one or more device inputs (not shown). Such inputs may include any device for entering information into the mobile device that is available and supported by the mobile device 400, such as a touch-screen, keyboard, mouse, cursor-control device, touch-screen, microphone, digital camera, video recorder, or camcorder. The device inputs may be used to enter information and interact with the mobile device 400 and, by extension, with the systems described herein.

Communications between mobile device 400 and other devices may be encrypted or decrypted using any suitable cryptographic method. In some embodiments, processor 402 may encrypt data (e.g., account data) prior to transmitting data to other devices, using any suitable cryptographic method. In some embodiments, account data stored in memory 403 may be stored in encrypted form, using any suitable cryptographic method.

Figure 5:
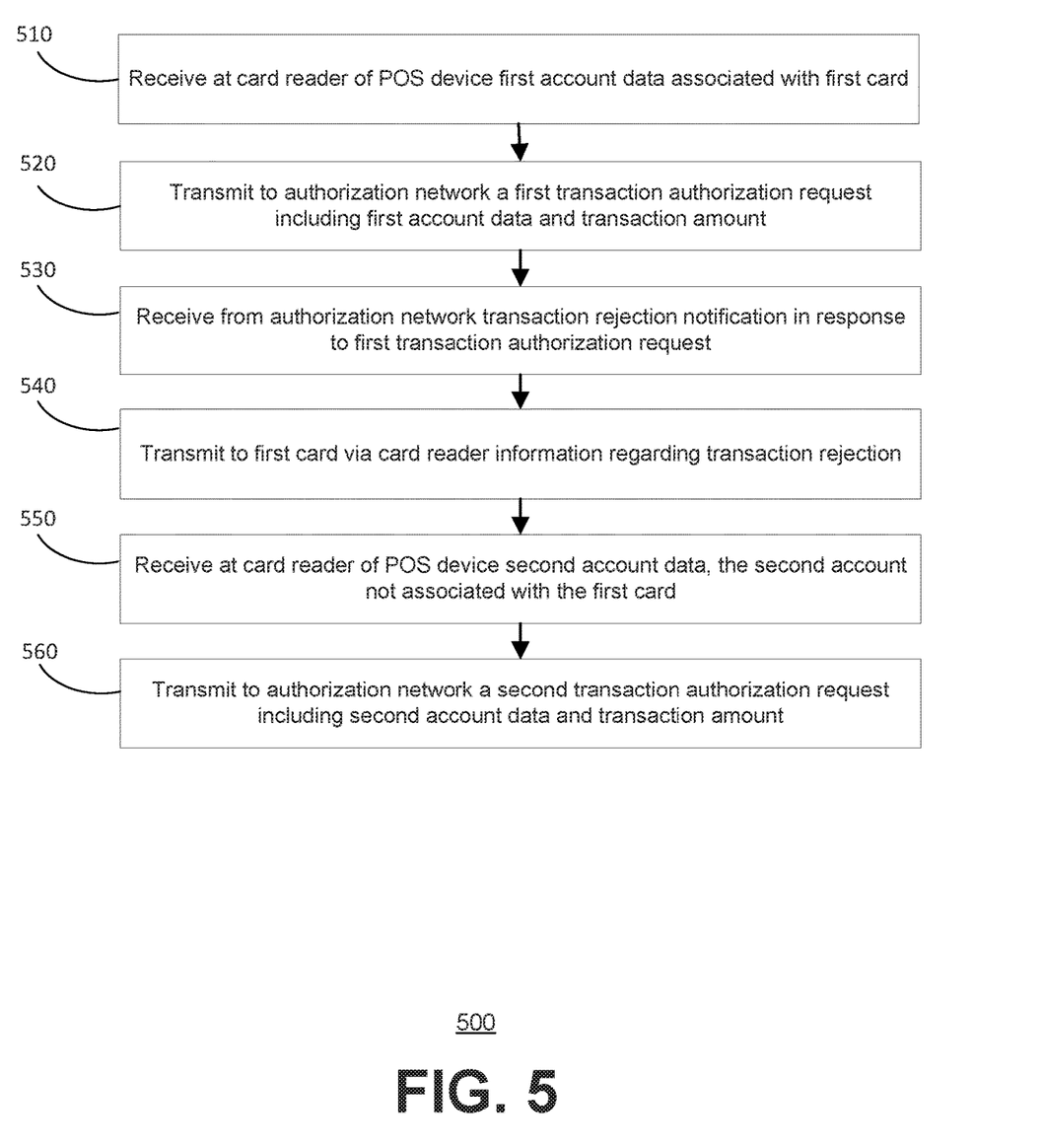
FIG. 5 is a flowchart illustrating a method of transaction processing control according to one or more example embodiments.

FIG. 5 is a flowchart illustrating a method of transaction processing control 500 according to one or more example embodiments, with reference to components and features described above including but not limited to the figures and associated description. Transaction processing control method 500 may be carried out by POS device 110 (e.g., by application 230 executing on POS device 200).

At block 510, POS device 110 may receive (e.g., via a card reader such as card reader 210 described above in FIG. 2 for POS device 200) first account data, the first account associated with a first card. First account data may include a first account number; first account data may include additional information relating to the first card, including expiration date, security code, or other account information. First account data may be stored on the first payment card. The first card may be inserted (or swiped, etc.) in POS device 110. The first card may be account-linked card 120 and may be associated with a user; use of the first card may be related to a user transaction. The first card may be a payment card (such as, e.g., a credit card or debit card).

At block 520, POS device 110 may transmit to a card authorization network (e.g., authorization network 150) a first transaction authorization request. The first transaction authorization request may include first account data and a transaction amount.

At block 530, POS device 110 may receive from the card authorization network (e.g., authorization network 150) a transaction rejection notification in response to the first transaction authorization request. The rejection notification may indicate that the first card associated with the first account has been rejected, and/or that the transaction with the first account data is not authorized.

At block 540, POS device 110 may transmit to the first card (e.g., card 120) via a card reader (e.g., card reader 210 described above in FIG. 2 for POS device 200) information regarding the transaction rejection. The transmitted transaction rejection information may include a request for information regarding a second account associated with the user. In an embodiment, POS device 110 may transmit the transaction rejection information to mobile device 130.

At block 550, POS device 110 may receive second account data associated with the user. The second account is not associated with the rejected first card. The second account may be associated with a second card (such as, e.g., a payment card). Second account data may include a second account number; second account data may include additional information relating to the second card, including expiration date, security code, or other account information. In some embodiments, second account data may be received (e.g., via a card reader such as card reader 210 described above in FIG. 2 for POS device 200) from card 120; card 120 may communicate with mobile device 130 to obtain the second account data. In some embodiments, POS device 110 may receive second account data directly from mobile device 130 rather than through card 120.

At block 560, POS device 110 may transmit to a card authorization network (e.g., authorization network 150) a second transaction authorization request. The second transaction authorization request may include second account data and the transaction amount.

A response to the second transaction authorization request may be received from the card authorization network. The response may indicate approval or rejection of the second transaction authorization request.

If the second transaction authorization request is approved (e.g. the second account data is accepted and the transaction thereby authorized), the transaction may be completed. In some embodiments, POS device 110 may indicate, via a display on the POS device, that the transaction was authorized using the second account number.

If the second transaction authorization request is rejected (e.g. the second account data is rejected), the process outlined above for FIG. 5 may be repeated by requesting third account data and submitting a third transaction authorization request.

Figure 6:
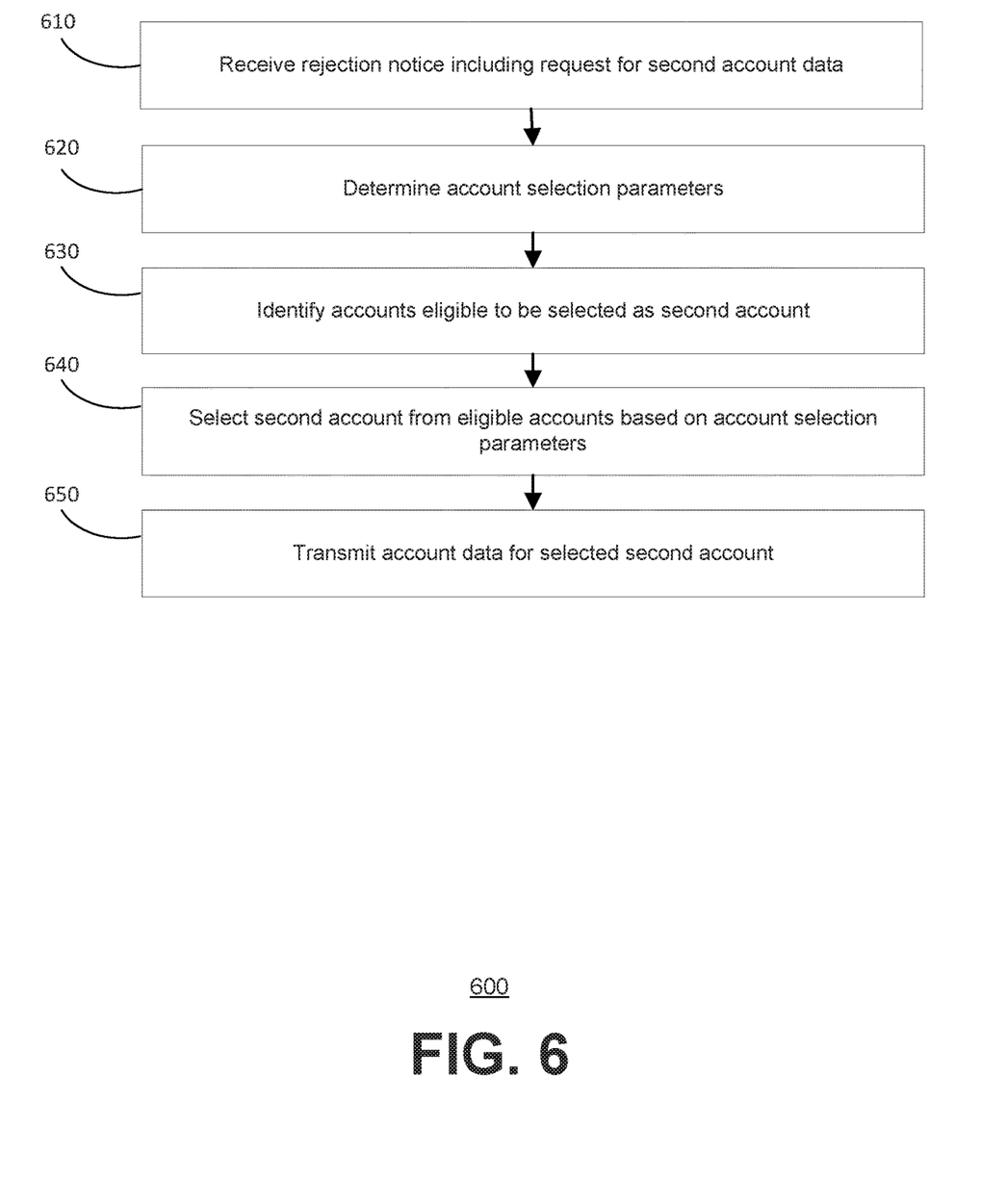
FIG. 6 is a flowchart illustrating a method of transaction processing control according to one or more example embodiments.

FIG. 6 is a flowchart illustrating a method of transaction processing control 600 according to one or more example embodiments, with reference to components and features described above including but not limited to the figures and associated description. Transaction processing control method 600 may be carried out by mobile device 130 (e.g., by application 401 executing on mobile device 400). Application 401 may be activated (e.g., launched) by the user, or automatically, such as, for example, upon receipt of a card rejection notice or other notification from server 140, or via detection of account-linked card 120 (e.g, entry of account-linked card 120 within a short-range wireless communication field, such as Bluetooth, NFC, or RFID).

At block 610, mobile device 130 may receive information regarding a transaction rejection notification, including a request for second account data. The second account data may be associated with a second payment card. Second account data is not stored on the first payment card at the time the request for second account data is received.

At block 620, mobile device 130 may determine parameters relating to selection of a second account for the transaction. Selection parameters may include one or more of card type (e.g., credit or debit); card issuer/card network (such as, e.g., Visa, MasterCard, or American Express); merchant; rewards program; product; card balance; transaction amount; available credit; etc. Selection parameters may include a list of cards or accounts ranked by the user. Parameters to be considered for a particular transaction may be based on the received transaction rejection information. For example, the first account, having been rejected, would be ineligible for selection as the second account. As another example, if the transaction rejection information indicates that the vendor does not accept American Express cards, selection parameters to be considered may include card issuer/card network. As another example, if the transaction rejection information indicates that the vendor does not accept credit cards, selection parameters to be considered may include may include card type. Other examples of transaction rejection information that may inform selection of the second account include insufficient credit, inactive card or account, or no rewards available.

At block 630, mobile device 130 may identify eligible second accounts based on selection parameters. For example, if selection parameters include card issuer/card network but excluding American Express (because the vendor does not accept American Express), only available MasterCard or Visa card accounts may be eligible for the second account. As another example, if selection parameters include card type but excluding credit (because the vendor does not accept credit cards), only available debit card accounts may be eligible for the second account. As another example, only those accounts having available credit sufficient to cover the transaction amount may be eligible.

At block 640, mobile device 130 may select a second account from eligible accounts based on selection parameters. For example, if one eligible account has a rewards program and other eligible accounts do not, the account with the rewards program may be selected as the second account. As another example, if one eligible account has a rewards program that prioritizes the particular merchant or product that is the subject of the transaction, that account may be selected, as the second account, over other eligible accounts that may only have a generic, non-prioritized rewards program. As another example, a second account may be selected from an eligible account having the lowest balance. As another example, a second account may be selected from an eligible account ranked higher than other eligible accounts by the user. In some embodiments, selection of a second account may be based on a list of eligible accounts without considering other selection parameters. In an embodiment, mobile device 130 may display a list of eligible accounts to the user and prompt the user to enter a selection.

At block 650, mobile device 130 may transmit account data for the selected second account to card 120. In an embodiment, mobile device 130 may transmit account data for the selected second account to POS device 110.

The description of embodiments in this disclosure provides non-limiting representative examples referencing figures and numerals to particularly describe features and teachings of different aspects of the disclosure. The embodiments described should be recognized as capable of implementation separately, or in combination, with other embodiments from the description of the embodiments. A person of ordinary skill in the art reviewing the description of embodiments should be able to learn and understand the different described aspects of the disclosure. The description of embodiments should facilitate understanding of the disclosure to such an extent that other implementations, not specifically covered but within the knowledge of a person of skill in the art having read the description of embodiments, would be understood to be consistent with an application of the disclosure Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A point of sale device, comprising:
    a card reader configured to read account information from an inserted card, the account information including an inserted card account number that is stored on the inserted card;
    a communications interface that is configured for data communication with an authorization network; and
    a processor connected to the card reader and the communications interface, the processor configured to:
        receive the account information from the inserted card via the card reader;
        communicate the inserted card account number via the authorization network to determine whether a transaction associated with the inserted card is authorized;
        receive an authorization response, the authorization response including a rejection notification if the transaction is not authorized;
        transmit the rejection notification to a mobile device, the mobile device in data communication with the inserted card via a wireless connection;
        receive a second account number from the inserted card via the card reader; and
        communicate the second account number via the authorization network to determine whether the transaction associated with the second account number is authorized.

2. The point of sale device of claim 1, wherein the processor is configured to transmit the rejection notification to the mobile device via the card reader and inserted card in a manner that enables the inserted card to transmit the rejection notice to the mobile device via the wireless connection.

3. The point of sale device of claim 1, wherein the processor is configured to transmit the rejection notification to the mobile device via a wireless connection between the point of sale device and mobile device and to receive the second account number from the mobile device via the wireless connection between the point of sale device and the mobile device.

4. The point of sale device of claim 1, wherein the inserted card includes a contact pad that is configured to communicate with the card reader and a wireless interface that is configured to communicate with the mobile device via the wireless connection.

5. The point of sale device of claim 4, wherein the inserted card receives power from the point of sale device via the contact pad.

6. The point of sale device of claim 4, wherein the inserted card further includes a battery to provide power to electronics contained in the inserted card.

7. The point of sale device of claim 1, wherein the mobile device is configured to select the second account number from a list of account numbers stored on the mobile device.

8. The point of sale device of claim 1, wherein the mobile device is configured to select the second account number based on information from the rejection notification.

9. A payment card, comprising:
    memory configured to store a first account number;
    a contact pad configured to, when the payment card is inserted into a card reader of a point of sale device, transmit the first account number to the card reader of the point of sale device and to receive a transaction rejection response if a transaction associated with the first account number is rejected; and
    a wireless communication interface configured for data communication with a mobile device;
    wherein, the transaction rejection response, upon receipt via the contact pad, is transmitted to the mobile device, thereby causing the mobile device to transmit a second account number stored on the mobile device in a manner that enables the second account number to be used to process the transaction instead of the first account number and wherein the wireless communication interface receives the second account number from the mobile device and transmits the second account number to the card reader of the point of sale device via the contact pad.

10. The payment card of claim 9, wherein the wireless communication interface is configured to communicate with the mobile device via Bluetooth.

11. The payment card of claim 9, wherein the payment card is configured to receive power from the point of sale device via the contact pad.

12. The payment card of claim 9, further comprising a battery configured to provide power to electronic components of the payment card.

13. The payment card of claim 9, wherein the mobile device is configured to select the second account number from a list of account numbers stored on the mobile device.

14. The payment card of claim 9, wherein the second account number is associated with a second payment card.

15. A method for transaction processing control, comprising:
- receiving, at a card reader of a point of sale device via a contact pad on a payment card in communication with the card reader, a first account number associated with the payment card;
- transmitting, via a communications interface on the payment card, a first transaction authorization request that includes the first account number and a transaction amount to an authorization network;
- receiving, via the communications interface on the payment card, a transaction rejection from the authorization network, said transaction rejection responsive to the first transaction authorization request;
- transmitting information indicating the transaction rejection to the contact pad on the payment card via the card reader;
- receiving, at the card reader of the point of sale device via the contact pad on the payment card, a second account number that is not associated with the payment card, said second account number being stored on a mobile device in wireless communication with the payment card; and
- transmitting, via the communications interface on the payment card, a second transaction authorization request that includes the second account number and the transaction amount to an authorization network.

16. The method of claim 15, further comprising:
- receiving, via the communications interface, a transaction authorization from the authorization network, said transaction authorization responsive to the second transaction authorization request; and
- indicating, via a display on the point of sale device, that the transaction was authorized using the second account number.

17. The method of claim 15, wherein the payment card and mobile device communicate wirelessly via a Bluetooth communication interface.

18. The method of claim 15, wherein the mobile device is configured to select the second account number from a list of account numbers stored on the mobile device.

19. The method of claim 15, wherein the mobile device is configured to select the second account number based on the information indicating the transaction rejection.

20. The method of claim 15, wherein the first account number is stored on the payment card.

* * * * *